(12) United States Patent
Yoshida

(10) Patent No.: US 7,910,651 B2
(45) Date of Patent: Mar. 22, 2011

(54) WATER-BASED INKS FOR INK-JET PRINTING

(75) Inventor: Hiroyuki Yoshida, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/516,523

(22) PCT Filed: Dec. 17, 2007

(86) PCT No.: PCT/JP2007/074621
§ 371 (c)(1),
(2), (4) Date: May 27, 2009

(87) PCT Pub. No.: WO2008/075764
PCT Pub. Date: Jun. 26, 2008

(65) Prior Publication Data
US 2010/0069561 A1    Mar. 18, 2010

(30) Foreign Application Priority Data
Dec. 19, 2006  (JP) .................. 2006-341534

(51) Int. Cl.
*C08L 51/00* (2006.01)
*C08D 11/02* (2006.01)

(52) U.S. Cl. .............. 524/504; 524/270; 524/547

(58) Field of Classification Search .............. 524/270, 524/504, 547
See application file for complete search history.

(56) References Cited

U.S. PATENT DOCUMENTS

| | | | | |
|---|---|---|---|---|
| 4,260,424 A | * | 4/1981 | Mizoguchi et al. | 106/500 |
| 5,622,548 A | * | 4/1997 | Zou et al. | 106/31.26 |
| 2001/0023365 A1 | * | 9/2001 | Medhkour et al. | 607/99 |
| 2003/0176536 A1 | | 9/2003 | Rathschlag et al. | |

FOREIGN PATENT DOCUMENTS

| | | | |
|---|---|---|---|
| EP | 1321495 A1 | * | 6/2003 |
| GB | 2 031 440 A | | 4/1980 |
| JP | 10-36732 A | | 2/1998 |
| JP | 10036732 A | * | 2/1998 |
| JP | 2004-204103 A | | 7/2004 |
| JP | 2004277448 A | * | 10/2004 |
| WO | WO-97/23575 A1 | | 7/1997 |
| WO | WO-02/22749 A1 | | 3/2002 |

* cited by examiner

*Primary Examiner* — Michael M Bernshteyn
(74) *Attorney, Agent, or Firm* — Birch, Stewart, Kolasch & Birch, LLP

(57) ABSTRACT

The present invention relates to (1) particles of a waster-insoluble polymer which contain a colorant, wherein the water-insoluble polymer contains a constitutional unit derived from a rosin containing a reactive unsaturated group; (2) a water dispersion and a water-based ink for ink-jet printing which exhibit a less unevenness of colors and a high optical density; and (3) a process for producing the water dispersion.

13 Claims, No Drawings

WATER-BASED INKS FOR INK-JET PRINTING

FIELD OF THE INVENTION

The present invention relates to water-based inks for ink-jet printing, polymer particles used in the water-based inks, water dispersions, and a process for producing the water dispersions.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using a plain paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate.

JP 9-217032A discloses a recording solution containing a dispersion of an organic pigment and a rosin emulsion in an aqueous liquid. In JP 9-217032A, although it is described that an aqueous resin may be mixed in the recording solution, there are no descriptions concerning water-insoluble polymer particles.

JP 10-140060A discloses an ink containing a colorant, a polyamide resin (film-forming resin), a tackifier resin such as a rosin ester, and an organic solvent. JP 2004-204103A discloses a pigment derivative containing a basic group, a polymer containing an ethylenically unsaturated monomer having a rosin skeleton as a polymerizable component, and a pigment-containing composition. However, the inks in these prior arts are of a non-aqueous type, and further the colorant is not incorporated in the resin.

JP 2003-138170A discloses a water-based ink containing an organic pigment, a rosin-modified water-soluble acrylic resin and water. However, the resin is water-soluble resins, and further the colorant is not incorporated in the resin.

JP 2004-277448A discloses a water-based ink containing a dispersion of a pigment being incorporated in a water-insoluble resin to render the pigment water-dispersible, resin fine particles containing a rosin resin, etc., a humectant, a penetrant and water. The pigment-containing polymer is an acrylic random copolymer and contains no rosin as a constitutional unit thereof.

The above conventional non-aqueous or water-based inks have been improved in properties thereof to some extent, but have failed to sufficiently suppress occurrence of unevenness or non-uniformity of colors upon printing with a high optical density.

SUMMARY OF THE INVENTION

The present invention relates to (1) particles of a water-insoluble polymer for ink-jet printing which contain a colorant, wherein the water-insoluble polymer contains a constitutional unit derived from a rosin containing a reactive unsaturated group; (2) a water dispersion and a water-based ink for ink-jet printing containing the particles of the water-insoluble polymer; and (3) a process for producing the water dispersion.

DETAILED DESCRIPTION OF THE INVENTION

The present invention relates to a water-based ink for ink-jet printing which exhibits not only a less unevenness of colors but also a high optical density, polymer particles used in the ink, a water dispersion, and a process for producing the water dispersion.

The present inventors have found that when using a polymer containing a constitutional unit derived from a rosin containing a reactive unsaturated group as the polymer for forming the colorant-containing water-insoluble polymer particles, the resultant water-based ink is prevented from penetrating into a recording medium in the thickness direction thereof to allow the colorant to be retained and dispersed in a surface layer of the recording medium, resulting in a less unevenness of colors and a high optical density.

The present invention relates to the following aspects (1) to (5):

(1) Particles of a water-insoluble polymer for ink-jet printing which contain a colorant, wherein the water-insoluble polymer contains a constitutional unit derived from a rosin containing a reactive unsaturated group.

(2) A water dispersion for ink-jet printing including the particles of the water-insoluble polymer as defined in the above aspect (1).

(3) A water dispersion for ink-jet printing including a colorant, and particles of a water-insoluble polymer containing a constitutional unit derived from a rosin containing a reactive unsaturated group.

(4) A water-based ink for ink-jet printing including the water dispersion as defined in the above aspect (2) or (3).

(5) A process for producing a water dispersion for ink-jet printing, including the following steps I and II:

Step I: dispersing a mixture containing a water-insoluble polymer containing a constitutional unit derived from a rosin containing a reactive unsaturated group, a colorant, an organic solvent and water to obtain a dispersion of particles of the water-insoluble polymer which contain the colorant; and Step II: removing the organic solvent from the dispersion obtained in the step I.

In the water dispersion and the water-based ink for ink-jet printing according to the present invention, from the viewpoints of a less unevenness of colors and a high optical density, there are used particles of a water-insoluble polymer which contain a colorant, wherein the water-insoluble polymer contains a constitutional unit derived from a rosin containing a reactive unsaturated group. In the followings, the respective components used in the present invention are explained.

Meanwhile, the particles of the water-insoluble polymer which contain a colorant are hereinafter occasionally referred to merely as "colorant-containing polymer particles".

(Colorant)

The colorant used in the present invention is not particularly limited, and there may be used any of pigment, hydrophobic dye, and water-soluble dye such as acid dye, reactive dye and direct dye. The colorant used in the present invention is preferably pigment or hydrophobic dye in view of a good water resistance, a good dispersion stability and a good rubbing resistance. Among these colorants, to meet the recent strong demand for a high weather resistance, preferred is the pigment.

The pigment or hydrophobic dye used in the water-based ink is required to be present in the form of stable fine particles using a surfactant or a polymer. In particular, in view of a good anti-bleeding property and a good water resistance, the pigment and/or hydrophobic dye are preferably included in the polymer particles.

The pigment may be either inorganic or organic. The inorganic or organic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue and C.I. Pigment Green, etc., with various product numbers. These organic pigments may also be used in the form of a solid solution. For example, as a solid solution of a magenta pigment, there is preferably used a solid solution composed of C.I. Pigment Violet and C.I. Pigment Red, and more preferably a solid solution composed of C.I. Pigment Violet 19 and C.I. Pigment Red 202.

Examples of the extender pigment include silica, calcium carbonate and talc.

The hydrophobic dyes are not particularly limited as long as they are capable of being included in the polymer particles. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer, such as preferably methyl ethyl ketone (MEK).

Examples of the hydrophobic dyes include oil-soluble dyes and disperse dyes. Among these dyes, preferred are oil-soluble dyes. Examples of the oil-soluble dyes include one or more dyes selected from the group consisting of commercially available products marketed from Orient Chemical Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

The above colorants may be used alone or in the form of a mixture containing any two or more thereof at an optional mixing ratio.

(Water-Insoluble Polymer Containing Constitutional Unit Derived from Rosin Containing Reactive Unsaturated Group; Hereinafter Occasionally Referred to Merely as "Water-Insoluble Polymer")

The water-insoluble polymer used in the present invention is preferably such a water-insoluble polymer exhibiting a solubility in water of 10 g or lower, preferably 5 g or lower and more preferably 1 g or lower when the polymer is dried at 105° C. for 2 h and then dissolved in 100 g of water at 25° C., in view of suppressing penetration of the colorant into a recording medium and improving an optical density. The solubility of the polymer having a salt-forming group means a solubility of the polymer whose salt-forming group is neutralized completely (i.e., 100%) with acetic acid or sodium hydroxide according to kind of the salt-forming group.

Examples of the water-insoluble polymer used in the present invention include polyesters, polyurethanes and vinyl polymers. Among these polymers, preferred are vinyl-based polymers obtained by addition polymerization of vinyl monomers such as vinyl compounds, vinylidene compounds and vinylene compounds in view of a good dispersion stability thereof.

The water-insoluble polymer used in the present invention is preferably a graft polymer which is produced by copolymerizing a monomer mixture containing (a) a salt-forming group-containing monomer (hereinafter occasionally referred to merely as a "component (a)"), (b) a rosin containing a reactive unsaturated group (hereinafter occasionally referred to merely as a "component (b)") and (c) a macromer (hereinafter occasionally referred to merely as a "component (c)") (such a mixture is hereinafter referred to merely as a "monomer mixture") in view of suppressing penetration of the colorant into a recording medium, improving an optical density and enhancing an interaction with the colorant and a dispersion stability. The graft polymer contains a constitutional unit derived from the component (a), a constitutional unit derived from the component (b) and a constitutional unit derived from the component (c). The water-insoluble graft polymer is more preferably in the form of a graft polymer containing the constitutional unit derived from the component (a) and the constitutional unit derived from the component (b) in a main chain thereof, and the constitutional unit derived from the component (c) in a side chain thereof. Further, the water-insoluble polymer preferably contains a constitutional unit derived from (d) a hydrophobic monomer (hereinafter occasionally referred to merely as a "component (d)") in view of improving an optical density.

[Salt-Forming Group-Containing Monomer (a)]

The salt-forming group-containing monomer (a) is used for enhancing a dispersion stability of the resultant water dispersion. Examples of the salt-forming group include a carboxyl group, a sulfonic group, a phosphoric group, an amino group and an ammonium group. Among these salt-forming groups, especially preferred is a carboxyl group.

Examples of the salt-forming group-containing monomers include cationic monomers and anionic monomers as described in the paragraph [0022] of JP 9-286939A, etc.

Typical examples of the cationic monomers include unsaturated amine-containing monomers and unsaturated ammonium salt-containing monomers. Among these cationic monomers, preferred are N,N-dimethylaminoethyl(meth)acrylate, N-(N',N'-dimethylaminopropyl)(meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

[Rosin Containing Reactive Unsaturated Group (b)]

The rosin (b) containing a reactive unsaturated group is used in order to retain the colorant in a surface layer of a recording medium and uniformly dispersing the colorant therein at a high concentration.

Examples of rosins used as a raw material for producing the rosin (b) containing a reactive unsaturated group in the present invention include natural rosins (1), modified rosins (2) and polymeric rosins (3).

The natural rosins (1) are in the form of a mixture of resin acids obtained from Pinaceae plants, and classified into gum rosins, wood rosins, tall oil rosins, etc., according to production methods thereof. These resin acids contain abietic acid having a three ring structure, conjugated double bonds and a carboxyl group as a main component, and may further contain neoabietic acid, dehydroabietic acid, palustric acid, pimaric acid, isopimaric acid, sandaracopimaric acid, levopimaric acid, etc. The respective contents of these resin acids vary depending upon methods for production of the natural rosins.

Examples of the modified rosins (2) include hydrogenated products of rosins such as dihydroabietic acid and tetrahydroabietic acid; disproportionated products of rosins such as dehydroabietic acid and dihydroabietic acid; acid-modified rosins, e.g., maleic acid-modified rosins such as maleopimaric acid, fumaric acid-modified rosins such as fumaropimaric acid, and acrylic acid-modified rosins such as acrylopimaric acid; and rosin esters, e.g., natural rosin esters in the form of an esterified product of a polyhydric alcohol such as glycerol and pentaerythritol with a natural rosin; modified rosin esters in the form of an esterified product of the polyhydric alcohol with a modified rosin such as a hydrogenated rosin, a disproportionated rosin and an acid-modified rosin; or polymeric rosin esters in the form of an esterified product of the polyhydric alcohol with a polymeric rosin (in particular, polymeric natural rosin).

The rosin esters may be in the form of a crosslinked rosin ester obtained by crosslinking these rosin esters with a crosslinking agent. The crosslinking agent preferably contains two isocyanate groups in a molecule thereof which are capable of forming an urethane bond with a hydroxyl group of the rosin ester. The crosslinked rosin ester is preferably in the form of a crosslinked modified rosin ester or a crosslinked polymeric rosin ester.

Examples of the polymeric rosins (3) include dimers and trimers of the above natural rosins (in particular, abietic acid) or the above modified rosins.

The rosin (b) containing a reactive unsaturated group as used in the present invention may be produced by reacting a reactive functional group of at least one compound selected from the group consisting of the natural rosins, modified rosins and polymeric rosins, with a monomer containing a reactive unsaturated group such as a radical-polymerizable unsaturated group. Of these reactive functional groups, preferred is a carboxyl group.

More specifically, examples of the monomer include amido group or substituted amide group-containing monomers, amino group or substituted amine group-containing monomers, hydroxyl group-containing monomers and epoxy group-containing monomers.

Specific examples of the amido group or substituted amide group-containing monomers include acrylamide, methacrylamide, diacetone acrylamide, N-methylol(meth)acrylamide, N-n-butoxymethyl acrylamide, N-i-butoxymethyl acrylamide, N,N-dimethyl acrylamide and N-methyl acrylamide.

Specific examples of the amino group or substituted amine group-containing monomers include aminoethyl acrylate, N,N-dimethylaminoethyl(meth)acrylate and N,N-diethylaminoethyl(meth)acrylate.

Specific examples of the hydroxyl group-containing monomers include 2-hydroxyethyl(meth)acrylate, 2-hydroxypropyl(meth)acrylate and allyl alcohol.

Specific examples of the epoxy group-containing monomers include glycidyl(meth)acrylate, glycidyl allyl ether and glycidyl methacryl ether. Of these epoxy group-containing monomers, preferred is glycidyl(meth)acrylate.

Among these rosins, preferred are those rosins obtained by reacting at least one compound selected from the group consisting of the natural rosins, modified rosins and polymeric rosins with a hydroxyl group-containing monomer and/or an epoxy group-containing monomer, in view of a good reactivity with a carboxyl group.

Suitable rosins used as the rosin (b) containing a reactive unsaturated group are those having the following properties (i) to (v):

(i) A softening point of from 300 to 600 K, preferably from 350 to 500 K and more preferably from 400 to 500 K as measured according to JIS K-5902-1969 (Rosin).

(ii) A weight-average molecular weight (Mw) of from 500 to 20,000, preferably from 1,000 to 18,000 and more preferably from 1,500 to 15,000.

Meanwhile, the weight-average molecular weight may be measured by a gel chromatograph "System 21" (filler: styrene/divinyl benzene copolymer; column flow rate: 1.0 mL/min; temperature: 40° C.) available from Shodex Corp., using tetrahydrofuran as an eluent and polystyrene as a standard substance.

(iii) A number-average molecular weight (Mn) of from 500 to 2,000 and preferably from 800 to 1,800.

(iv) An acid value of from 3 to 30 mg KOH/g, preferably from 5 to 20 mg KOH/g and more preferably from 8 to 18 mg KOH/g.

(v) A hydroxyl value of from 5 to 80 mg KOH/g, preferably from 8 to 50 mg KOH/g and more preferably from 10 to 40 mg KOH/g.

Meanwhile, the acid value and the hydroxyl value may be calculated from constitutional units of the polymer, or may also be determined by titration method in which the polymer is dissolved in a suitable solvent (for example, MEK).

Specific examples of the rosin (b) containing a reactive unsaturated group include a rosin monomer "KRA001" (addition product of a polymeric rosin with glycidyl methacrylate in which the amount of glycidyl methacrylate added to the polymeric rosin is ½ equivalent of the acid value of the polymeric rosin) available from Harima Chemicals, Inc., and ester of dehydroabietic acid with 2-hydroxypropyl acrylate (tradename: "BEAM SET 101") available from Arakawa Chemical Industries, Ltd.

[Macromer (c)]

The macromer (c) is used for enhancing a dispersion stability of the colorant-containing polymer particles. The macromer (c) is in the form of a monomer containing a polymerizable unsaturated group which has a number-average molecular weight of from 500 to 100,000 and preferably from 1,000 to 10,000. Meanwhile, the number-average molecular weight of the macromer (c) may be measured by gel chromatography using chloroform containing 1 mmol/L of dodecyl dimethylamine as a solvent and using polystyrene as a standard substance.

Among these macromers (c), in view of a good dispersion stability of the colorant-containing polymer particles, etc., preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl(meth)acrylate, phenoxyethyl(meth)acrylate, 2-hydroxy-3-phenoxypropyl acrylate and 2-methacryloyloxyethyl-2-hydroxypropyl phthalate. Among these aromatic group-containing (meth)acrylates, especially preferred is benzyl(meth)acrylate.

The polymerizable functional group bonded to one terminal end of these macromers is preferably an acryloyloxy group or a methacryloyloxy group. Examples of the other monomers copolymerizable with the aromatic group-containing (meth)acrylate include acrylonitrile, etc.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably 50% by weight or more and more preferably 70% by weight or more in view of enhancing an affinity to pigments.

The macromer (c) may further contain a side chain composed of other constitutional units derived from an organopolysiloxane, etc. Such a side chain may be produced, for example, by copolymerizing with the macromer, a silicone-based macromer having a polymerizable functional group at one terminal end thereof which is represented by the following formula (1):

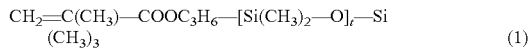

$$CH_2=C(CH_3)-COOC_3H_6-[Si(CH_3)_2-O]_t-Si(CH_3)_3 \quad (1)$$

wherein t is a number of from 8 to 40.

The styrene-based macromer as the component (c) is commercially available, for example, from Toagosei Co., Ltd., as product names of AS-6(S), AN-6(S), HS-6(S), etc.

[Hydrophobic Monomer (d)]

The monomer mixture preferably further contains a hydrophobic monomer (hereinafter occasionally referred to merely as a "component (d)"). The hydrophobic monomer (d) is used for enhancing an optical density of the resultant ink.

Examples of the hydrophobic monomer (d) include alkyl (meth)acrylates and aromatic group-containing monomers.

The preferred alkyl(meth)acrylates are those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). and the "(meth)acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component d-1), and the above aromatic group-containing (meth)acrylate (component d-2). Examples of the substituent group having a hetero atom include those exemplified previously.

Among these components (d), in view of enhancing an optical density, preferred is the styrene-based monomer (component d-1). Among these styrene-based monomers (component d-1), especially preferred are styrene and 2-methyl styrene. The content of the component (d-1) in the component (d) is preferably from 10 to 100% by weight and more preferably from 20 to 80% by weight in view of enhancing an optical density.

Also, examples of the preferred aromatic group-containing (meth)acrylate as the component (d-2) include benzyl(meth)acrylate and phenoxyethyl(meth)acrylate. The content of the component (d-2) in the component (d) is preferably from 10 to 100% by weight and more preferably from 20 to 80% by weight in view of enhancing an optical density and a gloss.

Further, the components (d-1) and (d-2) are preferably used in combination with each other.

The monomer mixture may further contain (e) a hydroxyl-containing monomer (hereinafter occasionally referred to merely as a "component (e)"). The hydroxyl-containing monomer (e) is used in order to exhibit an excellent effect of enhancing a dispersion stability.

Examples of the component (e) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the following descriptions) (meth)acrylate, polypropylene glycol (n=2 to 30) (meth)acrylate, and polyethylene glycol (n=1 to 15)/propylene glycol (n=1 to 15) (meth)acrylate. Among these hydroxyl-containing monomers, preferred are 2-hydroxyethyl(meth)acrylate, polyethylene glycol monomethacrylate and polypropylene glycol methacrylate.

The monomer mixture may further contain (f) a monomer (hereinafter occasionally referred to merely as a "component (f)") represented by the following formula (2):

$$CH_2=C(R^1)COO(R^2O)_qR^3 \quad (2)$$

wherein $R^1$ is a hydrogen atom or a lower alkyl group having 1 to 5 carbon atoms; $R^2$ is a divalent hydrocarbon group having 1 to 30 carbon atoms which may contain a hetero atom; $R^3$ is a monovalent hydrocarbon group having 1 to 30 carbon atoms which may contain a hetero atom; and q represents an average molar number of addition of $R^2O$ groups, and is a number of from 1 to 60 and preferably a number of from 1 to 30.

The component (f) is used in order to exhibit an excellent effect of enhancing an ejection property of the resultant ink.

Examples of the hetero atom contained in the component (f) of the formula (2) include a nitrogen atom, an oxygen atom, a halogen atom and a sulfur atom.

Examples of the suitable $R^1$ group include methyl, ethyl and (iso)propyl.

Examples of the suitable $R^2O$ group include oxyethylene, oxytrimethylene, oxypropane-1,2-diyl, oxytetramethylene, oxyheptamethylene, oxyhexamethylene, and an oxyalkanediyl (oxyalkylene) group having 2 to 7 carbon atoms which is constituted from combination of at least two of these groups.

Examples of the suitable $R^3$ group include an aliphatic alkyl group having 1 to 30 carbon atoms and preferably 1 to 20 carbon atoms, an aromatic ring-containing alkyl group having 7 to 30 carbon atoms, and a hetero ring-containing alkyl group having 4 to 30 carbon atoms.

Specific examples of the component (f) include methoxy polyethylene glycol (q in the formula (2): 1 to 30; this definition is similarly applied to the following compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy (ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Specific examples of the commercially available components (e) and (f) include polyfunctional acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (f) may be respectively used alone or in the form of a mixture of any two or more thereof.

Upon production of the water-insoluble polymer, the contents of the above components (a) to (f) in the monomer mixture (contents of non-neutralized components; this definition is similarly applied to the following descriptions) or the contents of the constitutional units derived from the components (a) to (f) in the water-insoluble polymer are as follows.

The content of the component (a) is preferably from 2 to 40% by weight, more preferably from 2 to 30% by weight and still more preferably from 3 to 20% by weight in view of a good dispersion stability of the resultant water dispersion.

The content of the component (b) is preferably from 3 to 70% by weight, more preferably from 5 to 60% by weight, still more preferably from 7 to 50% by weight, further still more preferably from 10 to 50% by weight and most preferably from 15 to 50% by weight in view of suppressing penetration of the colorant into a recording medium.

The content of the component (c) is preferably from 1 to 25% by weight and more preferably from 5 to 20% by weight, in particular, in view of enhancing an interaction with the colorant.

The content of the component (d) is preferably from 5 to 98% by weight and more preferably from 10 to 60% by weight in view of enhancing an optical density.

The content of the component (e) is preferably from 5 to 40% by weight and more preferably from 7 to 20% by weight in view of a good dispersion stability of the resultant water dispersion.

The content of the component (f) is preferably from 5 to 50% by weight and more preferably from 10 to 40% by weight in view of a good ejection property of the resultant ink.

The total content of the components (a) and (f) in the monomer mixture is preferably from 6 to 75% by weight and more preferably from 13 to 50% by weight in view of a good dispersion stability of the resultant water dispersion and a good ejection property of the resultant ink. The weight ratio of the component (b) to the component (c) [component (b)/component (c)] is preferably from 1/10 to 10/1 and more preferably from 1/5 to 5/1 in view of suppressing penetration of the colorant into a recording medium, improving an optical density, and enhancing an interaction with the colorant and, therefore, a dispersion stability. The total content of the components (b) and (d) in the monomer mixture is preferably from 10 to 80% by weight, more preferably from 20 to 70% by weight and still more preferably from 30 to 70% by weight in view of suppressing penetration of the colorant into a recording medium and improving an optical density.

Also, the weight ratio of the component (a) to a sum of the components (b), (c) and (d) [component (a)/(component (b)+component (c)+component (d))] is preferably from 0.01 to 1, more preferably from 0.03 to 0.67 and still more preferably from 0.05 to 0.50 in view of a good dispersion stability and a good optical density of the resultant water dispersion.

(Production of Water-Insoluble Polymer)

The water-insoluble polymer may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone, MEK and methyl isobutyl ketone (MIBK); and esters such as ethyl acetate. Among these solvents, preferred are methanol, ethanol, acetone, MEK, MIBK and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C. for 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the water-insoluble polymer used in the present invention is preferably from 3,000 to 300,000 and more preferably from 5,000 to 250,000 in view of a good optical density, a good gloss and a good dispersion stability of the colorant therein. Meanwhile, the weight-average molecular weight of the water-insoluble polymer may be measured by the method as described in Examples below.

When the water-insoluble polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and still more preferably from 50 to 150%.

The degree of neutralization of the anionic salt-forming group is calculated according to the following formula (3):

$$\{[\text{weight (g) of neutralizing agent/equivalent of neutralizing agent}]/[\text{acid value of polymer (KOH mg/g)} \times \text{weight (g) of polymer}/(56 \times 1000)]\} \times 100 \quad (3)$$

The degree of neutralization of the cationic salt-forming group is calculated according to the following formula (4):

$$\{[\text{weight (g) of neutralizing agent/equivalent of neutralizing agent}]/[\text{amine value of polymer (HCl mg/g)} \times \text{weight (g) of polymer}/(36.5 \times 1000)]\} \times 100 \quad (4)$$

The acid value or amine value may be calculated from the respective constitutional units of the polymer, or may also be determined by the method of subjecting a solution prepared by dissolving the polymer in an appropriate solvent such as, for example, MEK to titration.

(Production of Water Dispersion of Colorant-Containing Polymer Particles)

The method for producing the water dispersion of the colorant-containing water-insoluble polymer particles for ink-jet printing according to the present invention in which the water-insoluble polymer contains a constitutional unit derived from the rosin containing a reactive unsaturated group, is not particularly limited. However, the water dispersion can be produced in an efficient manner by the process including the following steps I and II.

Step I: Dispersing a mixture containing the water-insoluble polymer containing a constitutional unit derived from the rosin containing a reactive unsaturated group, a colorant, an organic solvent and water to obtain a dispersion of colorant-containing polymer particles; and Step II: Removing the organic solvent from the dispersion obtained in the step I.

In the step I, preferably, the water-insoluble polymer is first dissolved in the organic solvent, and then the colorant and water together with optional components such as a neutralizing agent and a surfactant, if required, are added to the thus obtained organic solvent solution under mixing to obtain a dispersion of an oil-in-water type. The content of the colorant in the mixture is preferably from 5 to 50% by weight and more preferably from 10 to 40% by weight. The content of the organic solvent in the mixture is preferably from 10 to 70% by weight and more preferably from 10 to 50% by weight. The content of the water-insoluble polymer in the mixture is preferably from 2 to 40% by weight and more preferably from 3 to 20% by weight, and the content of water in the mixture is preferably from 10 to 70% by weight and more preferably from 20 to 70% by weight.

When the water-insoluble polymer contains a salt-forming group, the neutralizing agent is preferably used in the mixture. The degree of neutralization of the salt-forming group in the polymer is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization for the water-insoluble polymer. Examples of the neutralizing agent used in the present invention include those exemplified above. In addition, the water-insoluble polymer may be previously neutralized.

Examples of the organic solvents include alcohol solvents such as ethanol, isopropanol and isobutanol; ketone solvents such as acetone, MEK, methyl isobutyl ketone and diethyl ketone; and ether solvents such as dibutyl ether, tetrahydrofuran and dioxane. The solubility of these organic solvent in 100 g of water is preferably 5 g or higher and more preferably 10 g or higher, more specifically preferably from 5 to 80 g and more preferably from 10 to 50 g as measured at 20° C. Among these organic solvents, preferred are MEK and methyl isobutyl ketone.

The method for dispersing the mixture in the step I is not particularly limited. The polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired value. In addition, upon conducting the substantial dispersion procedure, the below-mentioned methods for the substantial dispersion may be used in combination of any two or more thereof. The dispersion procedure in the step I is preferably conducted at a temperature of from 5 to 50° C. and more preferably from 10 to 35° C.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from EBARA Corp.), "TK Homomixer", "TK Pipeline Mixer", "TK Homo Jetter", "TK Homomic Line Flow" and "Filmix" (tradenames: all available from PRIMIX Corp.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, in the case where the pigment is contained in the mixture, the roll mills, beads mills, kneaders and high-pressure homogenizers are preferred in view of reducing a particle size of the pigment. These apparatuses may be used in combination of any two or more thereof.

In the step II, the organic solvent is removed from the thus obtained dispersion by known methods to render the dispersion aqueous, thereby obtaining a water dispersion of the colorant-containing polymer particles. The organic solvent is preferably substantially completely removed from the thus obtained water dispersion. The content of the residual organic solvent in the resultant water dispersion is preferably 0.1% by weight or lower and more preferably 0.01% by weight or lower.

In the thus-obtained water dispersion of the colorant-containing polymer particles, a solid component made of the colorant-containing polymer is dispersed in water as a main medium. The configuration of the polymer particles is not particularly limited as long as the particles are formed from at least the colorant and the water-insoluble polymer. Examples of the configuration of the polymer particles include the particle configuration in which the colorant is enclosed in the respective water-insoluble polymer particles, the particle configuration in which the colorant is uniformly dispersed in the respective water-insoluble polymer particles, and the particle configuration in which the colorant is exposed onto a surface of the respective water-insoluble polymer particles.

The weight ratio of the water-insoluble polymer to the colorant [water-insoluble polymer/colorant] is preferably from 5/95 to 90/10, more preferably from 10/90 to 75/25 and still more preferably from 15/85 to 50/50 in view of a good dispersion stability of the polymer particles.

(Water Dispersion and Water-Based Ink for Ink-Jet Printing)

The water-based ink of the present invention contains the water dispersion of the present invention, and may further contain various additives such as wetting agents, dispersants, defoaming agents, mildew-proof agents and chelating agents, if required. The method of mixing these additives in the water-based ink is not particularly limited.

In view of a good optical density and a less unevenness of colors, the content of the colorant in the water dispersion for ink-jet printing is preferably from 3 to 40% by weight and more preferably from 5 to 30% by weight, and the content (solid content) of the water-insoluble polymer in the water dispersion is preferably from 0.5 to 20% by weight, more preferably from 1 to 15% by weight and still more preferably from 1 to 10% by weight.

In view of a good optical density and a less unevenness of colors, the content of the colorant in the water-based ink for ink-jet printing is preferably from 0.5 to 20% by weight and more preferably from 1 to 15% by weight, and the content (solid content) of the water-insoluble polymer in the water-based ink is preferably from 0.3 to 20% by weight, more preferably from 0.5 to 15% by weight and still more preferably from 0.8 to 10% by weight.

The content of water in the water dispersion and the water-based ink for ink-jet printing according to the present invention is preferably from 30 to 90% by weight and more preferably from 40 to 80% by weight.

The average particle size of the colorant-containing polymer particles contained in the water dispersion and the water-based ink is preferably from 40 to 400 nm, more preferably from 50 to 300 nm and still more preferably from 60 to 200 nm in view of a less unevenness of colors and a good dispersion stability. Meanwhile, the average particle size of the colorant-containing polymer particles may be measured by the method described in the following Examples.

The viscosity of the water dispersion having a solid content of 20% by weight is preferably from 2 to 6 mPa·s and more preferably from 2 to 5 mPa·s as measured at 20° C. to produce a water-based ink having a suitable viscosity. The viscosity of the water-based ink is preferably from 2 to 12 mPa·s and more preferably from 2.5 to 10 mPa·s as measured at 20° C. in view of maintaining a good ejection reliability thereof. Meanwhile, the viscosity of the water dispersion or the water-based ink may be measured by the method described in the following Examples.

The surface tension of the water dispersion of the present invention is preferably from 30 to 70 mN/m and more preferably from 35 to 68 mN/m as measured at 20° C., and the surface tension of the water-based ink of the present invention is preferably from 25 to 50 mN/m and more preferably from 25 to 45 mN/m as measured at 20° C., in view of a good optical density. Also, the pH of the water-based ink is preferably from 4 to 10.

The ink-jet printing method using the water-based ink of the present invention is not particularly limited, and is suitably applied to piezoelectric-type ink-jet printers.

Examples

In the following production examples, examples and comparative examples, the "part(s)" and "%" indicate "part(s) by weight" and "% by weight", respectively, unless otherwise specified. Meanwhile, the weight-average molecular weight, viscosity and average particles size were respectively measured by the following methods.

(1) Measurement of Weight-Average Molecular Weight of Polymer

The weight-average molecular weight of the water-insoluble polymer was measured by gel chromatography using N,N-dimethyl formamide containing 60 mmol/L of phosphoric acid and 50 mmol/L of lithium bromide as a solvent and using polystyrene as a standard substance. Also, as a column for the gel chromatography, there was used HLC-8120GPC available from Tosoh Corporation.

(2) Measurement of Viscosity

The viscosity was measured using an E-type viscometer with a standard rotor (1°34'×R24) at a temperature of 20° C. for 1 min by setting a rotating speed thereof to 100 rpm.

(3) Measurement of Average Particle Size of Colorant-Containing Polymer Particles The average particle size was measured by using a laser particle analyzing system "ELS-8000" (cumulant analysis) available from Otsuka Denshi Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. The concentration of the water dispersion or the water-based ink to be measured was usually about $5 \times 10^{-3}$% by weight.

Production Example 1

Twenty parts of MEK and 0.03 part of a chain transfer agent (2-mercaptoethanol) together with 10% of 200 parts of a monomer mixture shown in Table 1 were charged into a reaction vessel and mixed with each other, and then the reaction vessel was fully purged with a nitrogen gas to thereby obtain a mixed solution.

Separately, remaining 90% of the monomer mixture shown in Table 1 was charged into a dropping funnel, and further 0.27 part of the chain transfer agent, 60 parts of MEK and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping while maintaining the temperature at 65° C., a solution prepared by dissolving 0.3 part by weight of the radical polymerization initiator in 5 parts of MEK was added to the mixed solution, and the resultant reaction solution was further aged at 65° C. for 2 h and then at 70° C. for 2 h to obtain a solution of a polymer. As a result, it was confirmed that the thus obtained polymer had a weight-average molecular weight of 15,000. The results are shown in Table 1.

Meanwhile, the details of the respective monomers shown in Table 1 are as follows.

(b) Rosin monomer "KRA001" available from Harima Chemicals, Inc.; addition product of a polymeric rosin with glycidyl methacrylate in which the amount of glycidyl methacrylate added is ½ equivalent of an acid value of the polymeric rosin.

(b) Rosin monomer "BEAM SET 101" (tradename) available from Arakawa Chemical Industries, Ltd.; ester of dehydroabietic acid with 2-hydroxypropyl acrylate.

(c) Styrene Macromer: "AS-6S" (tradename) available from Toagosei Corp.; number-average molecular weight: 6000; polymerizable functional group: methacryloyloxy group.

(f) Polyethylene glycol monomethacrylate (average molar number of addition of ethyleneoxide: 9; "NK-ESTER M-90G" (tradename) available from Shin-Nakamura Kagaku Kogyo Co., Ltd.

(f) Polypropylene glycol monomethacrylate (average molar number of addition of propyleneoxide 9; "BLEMMER PP-500" (tradename) available from NOF Corporation.

Production Example 2

The same procedure as in Production Example 1 was repeated except for using no benzyl methacrylate (d) and changing the amount of the rosin monomer (b) "KRA001" used to 40% by weight, thereby obtaining a solution of a polymer. The results are shown in Table 1.

Production Example 3

The same procedure as in Production Example 1 was repeated except for using the rosin monomer (b) "BEAM SET 101" in place of the rosin monomer (b) "KRA001", thereby obtaining a solution of a polymer. The results are shown in Table 1.

Production Example 4

The same procedure as in Production Example 3 was repeated except for using no benzyl methacrylate (d) and changing the amount of the rosin monomer (b) "BEAM SET 101" used to 40% by weight, thereby obtaining a solution of a polymer. The results are shown in Table 1.

Production Example 5

The same procedure as in Production Example 1 was repeated except for using no rosin monomer (b) and changing the amount of the benzyl methacrylate (d) used to 40% by weight, thereby obtaining a solution of a polymer. The results are shown in Table 1.

TABLE 1

| | Production Examples | | | | |
|---|---|---|---|---|---|
| | 1 | 2 | 3 | 4 | 5 |
| Kind of monomer (part by weight of solid component) | | | | | |
| (a) Methacrylic acid | 10 | 10 | 10 | 10 | 10 |
| (b) Rosin monomer "KRA001" | 10 | 40 | — | — | — |
| (b) Rosin monomer "BEAM SET 101" | — | — | 10 | 40 | — |
| (c) Styrene macromer | 15 | 15 | 15 | 15 | 15 |
| (d) Benzyl methacrylate | 30 | — | 30 | — | 40 |
| (d) Styrene monomer | 10 | 10 | 10 | 10 | 10 |
| (f) Polyethylene glycol monomethacrylate | 5 | 5 | 5 | 5 | 5 |
| (f) Polypropylene glycol monomethacrylate | 20 | 20 | 20 | 20 | 20 |
| Weight-average molecular weight | 15,000 | 12,000 | 15,000 | 10,000 | 200,000 |

Example 1

Twenty five parts of the polymer produced by drying the polymer solution obtained in Production Example 1 under reduced pressure was dissolved in 50 parts of MEK. Further, a neutralizing agent composed of 4.6 parts of a 5N sodium hydroxide aqueous solution and 2.2 parts of a 25% ammonia aqueous solution was added to the resultant solution to neutralize a salt-forming group of the polymer (degree of neutralization: 75%). Next, 100 parts of a quinacridone pigment (C.I. Pigment Violet 19 "Hostaperm Red E5B02 (tradename)" available from Clariant Japan Co., Ltd.) was added into the reaction solution, and then kneaded at 20° C. for 30 min using a roll mill. The resultant kneaded material was further dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then MEK was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from FUJIFILM Corp.) fitted to a 25 mL syringe without a needle available from TERUMO Corp., to remove coarse particles therefrom, thereby obtaining a water dispersion of pigment-containing polymer particles having a solid content of 20%. As a result, it was confirmed that the average particle size of the thus obtained pigment-containing polymer particles was 110 nm as measured by the above-mentioned measuring method.

Forty parts of the thus obtained water dispersion of the pigment-containing polymer particles was mixed with 7 parts of triethylene glycol monobutyl ether, 1 part of "SURFYNOL 465" available from Nissin Chemical Industry Co., Ltd., 0.3 part of "Ploxel XL2" available from Avecia KK and 36 parts of ion-exchanged water, and then the resultant mixture was further mixed with glycerol and water so as to adjust a total volume of the solution to 100 parts and control a viscosity thereof to 4 mPa·s as measured at 20° C. The resultant mixed solution was filtered through a 1.2 μm-mesh filter (acetyl cellulose membrane; outer diameter: 2.5 cm; available from FUJIFILM Corp.) fitted to a 25 mL syringe without a needle to remove coarse particles therefrom, thereby obtaining a water-based ink.

Comparative Example 1

The same procedure as in Example 1 was repeated except for using the polymer solution obtained in Production Example 5 in place of the polymer solution obtained in Production Example 1, thereby obtaining a water-based ink. As a result, it was confirmed that the obtained pigment-containing polymer particles had an average particle size of 110 nm.

Example 2

The same procedure as in Example 1 was repeated except for using the polymer solution obtained in Production Example 2 in place of the polymer solution obtained in Production Example 1, thereby obtaining a water-based ink. As a result, it was confirmed that the obtained pigment-containing polymer particles had an average particle size of 110 nm.

Example 3

The same procedure as in Example 1 was repeated except for using the polymer solution obtained in Production Example 3 in place of the polymer solution obtained in Production Example 1, thereby obtaining a water-based ink. As a result, it was confirmed that the obtained pigment-containing polymer particles had an average particle size of 110 nm.

Example 4

The same procedure as in Example 1 was repeated except for using the polymer solution obtained in Production Example 4 in place of the polymer solution obtained in Production Example 1, thereby obtaining a water-based ink. As a result, it was confirmed that the obtained pigment-containing polymer particles had an average particle size of 110 nm.

Next, the optical density and unevenness of colors of the respective inks obtained in the above Examples and Comparative Examples were evaluated by the following methods. The results are shown in Table 2.

(1) Optical Density

Solid image printing was carried out on a high-grade plain paper "XEROX 4024 (tradename)" commercially available from Xerox Corp., using an ink-jet printer "Model EM-930C" (piezoelectric type) available from Seiko Epson Co., Ltd., under the following printing conditions:
 Kind of Paper: Plain Paper
 Mode set: Fine.

After allowing the printed paper to stand at 25° C. for 24 h, the optical density was measured at total five positions of the printed paper (5.1 cm×8.0 cm) including a center and four corners thereof using a Macbeth densitometer "SPECTRO-EYE" (product name) available from Gretag-Macbeth Corp., to calculate an average of the measured values.

Meanwhile, since the printing mode was set to "Fine" having no overprinting of the ink, the optical density is preferably 0.92 or more.

(2) Unevenness of Colors

The unevenness of colors means an unevenness (non-uniformity) of the optical density, and was evaluated by observing color non-uniformity on solid image printing portions of the above printed paper by naked eyes, according to the following evaluation criteria.

TABLE 2

| Production Examples for polymers | Rosin monomers Kind | Content (wt %) | Evaluation results Optical density | Unevenness of colors |
|---|---|---|---|---|
| Example 1 | Production Example 1 | KRA001 | 10 | 0.94 | ○ |
| Comparative Example 1 | Production Example 5 | — | — | 0.92 | ○ |
| Example 2 | Production Example 2 | KRA001 | 40 | 0.98 | ○ |
| Example 3 | Production Example 3 | BEAM SET 101 | 10 | 0.93 | ○ |
| Example 4 | Production Example 4 | BEAM SET 101 | 40 | 0.94 | ○ |

○: No unevenness of colors occurred.
X: Noticeable uneven colors apparently occurred.

From the results shown in Table 2, it was confirmed that the water-based inks obtained in Examples 1 to 4 were enhanced in optical density as well as exhibited no unevenness of colors printed as compared to those obtained in Comparative Example 1 notwithstanding the inks were used by setting the printing mode to "Fine" under which penetration of the pigments into a plain paper is likely to occur and the optical density is hardly improved. Further, it was confirmed that the difference in optical density between the Examples and Comparative Example was 0.01 or more which was fully recognizable by naked eyes.

INDUSTRIAL APPLICABILITY

The water-based ink containing the polymer particles and the water dispersion for ink-jet printing according to the present invention can exhibit a less unevenness of colors, and can produce printed images or characters having a high optical density.

Also, in accordance with the process of the present invention, the water dispersion for ink-jet printing can be produced in an efficient manner.

The invention claimed is:

1. Particles of a water-insoluble polymer for ink-jet printing which contain a colorant, wherein the water-insoluble polymer is obtained by copolymerizing a monomer mixture containing (a) a salt-forming group-containing monomer and (b) a rosin containing a reactive unsaturated group;
 wherein the (b) rosin containing the reactive unsaturated group is obtained by reacting at least one compound selected from the group consisting of natural rosins, modified rosins and polymeric rosins with a hydroxyl group-containing monomer and/or an epoxy group-containing monomer,
  wherein the natural rosins are resin acids obtained from Pinaceae plants;
  wherein the modified rosins are at least one compound selected from the group consisting of:

i) hydrogenated products of rosins selected from the group consisting of dihydroabietic acid and tetrahydroabietic acid;
ii) disproportionated products of rosins selected from the group consisting of dehydroabietic acid and dihydroabietic acid;
iii) acid-modified rosins selected from the group consisting of maleopimaric acid, fumaropimaric acid, and acrylopimaric acid; and
iv) rosin esters selected from the group consisting of natural rosin esters formed from a polyhydric alcohol and a natural rosin and modified rosin esters formed from a polyhydric alcohol and a modified rosin of i), ii) or iii) above;
wherein the polymeric rosins are dimers and trimers of said natural rosins or said modified rosins.

2. The particles according to claim 1, wherein a content of the constitutional unit derived from a rosin containing a reactive unsaturated group in the water-insoluble polymer is from 3 to 70% by weight.

3. The particles according to claim 1, wherein the water-insoluble polymer is a graft polymer containing a constitutional unit derived from (a) a salt-forming group-containing monomer and a constitutional unit derived from (b) the rosin containing a reactive unsaturated group in a main chain thereof, and a constitutional unit derived from (c) a macromer in a side chain thereof.

4. The particles according to claim 1, wherein the water-insoluble polymer has a weight-average molecular weight of from 3,000 to 300,000.

5. A water dispersion for ink jet printing comprising the particles of the water-insoluble polymer as defined in claim 1.

6. A water-based ink for ink-jet printing comprising the water dispersion as defined in claim 5.

7. A process for producing the water dispersion for ink-jet printing as defined in claim 5, comprising the following steps I to IV:
Step I: obtaining (b) the rosin containing a reactive unsaturated group by reacting at least one compound selected from the group consisting of the natural rosins, modified rosins and polymeric rosins with the hydroxyl group-containing monomer and/or epoxy group-containing monomer;
Step II: obtaining a water-insoluble polymer containing a constitutional unit derived from (b) the rosin containing a reactive unsaturated group by copolymerizing a monomer mixture containing (a) the salt-forming group-containing monomer and (b) the rosin containing a reactive unsaturated group obtained in step I;
Step III: dispersing a mixture containing the water-insoluble polymer containing a constitutional unit derived from (b) the rosin containing a reactive unsaturated group, a colorant, an organic solvent and water to obtain a dispersion of particles of the water-insoluble polymer which contain the colorant; and
Step IV: removing the organic solvent from the dispersion obtained in step III;
wherein the natural rosins are resin acids obtained from Pinaceae plants;
wherein the modified rosins are at least one compound selected from the group consisting of:
i) hydrogenated products of rosins selected from the group consisting of dihydroabietic acid and tetrahydroabietic acid;
ii) disproportionated products of rosins selected from the group consisting of dehydroabietic acid and dihydroabietic acid;
iii) acid-modified rosins selected from the group consisting of maleopimaric acid, fumaropimaric acid, and acrylopimaric acid; and
iv) rosin esters selected from the group consisting of natural rosin esters formed from a polyhydric alcohol and a natural rosin and modified rosin esters formed from a polyhydric alcohol and a modified rosin of i), ii) or iii) above;
wherein the polymeric rosins are dimers and trimers of said natural rosins or said modified rosins.

8. The particles according to claim 1, wherein the natural rosins are a mixture of resin acids containing abietic acid and at least one acid selected from tile group consisting of abietic acid, neoabietic acid, dehydroabietic acid, palustric acid, pimaric acid, isopimaric acid, sandaracopimaric acid, and levopimaric acid.

9. The particles according to claim 1, wherein the rosin esters are crosslinked with a crosslinking agent.

10. The particles according to claim 1, wherein the crosslinking agent contains two isocyanate groups which are capable of forming an urethane bond with a hydroxyl group of the rosin ester.

11. The particles according to claim 1, wherein the contents of the constitutional units derived from (b) the rosin containing a reactive unsaturative group in the water-insoluble polymer is from 10 to 50% by weight.

12. The particles according to claim 1, wherein (b) the rosin containing a reactive unsaturated group is obtained by reacting disproportionated rosins or polymeric rosins with at least one monomer selected from the group consisting of 2-hydroxyethyl (meth)acrylate, 2-hydroxypropyl (meth)acrylate, allyl alcohol and glycidyl (meth)acrylate.

13. The particles according to claim 1, wherein (b) the rosin containing a reactive unsaturated group is an addition product of a polymeric rosin with glycidyl methacrylate or ester of dehydroabietic acid with 2-hydroxypropyl acrylate.

* * * * *